United States Patent [19]

Kuo

[11] Patent Number: 5,312,891
[45] Date of Patent: May 17, 1994

[54] THERMOSETTING COATING COMPOSITIONS

[75] Inventor: Thauming Kuo, Kingsport, Tenn.

[73] Assignee: Eastman Kodak Company, Rochester, N.Y.

[21] Appl. No.: 106,750

[22] Filed: Aug. 16, 1993

Related U.S. Application Data

[60] Division of Ser. No. 954,993, Oct. 1, 1992, Pat. No. 5,256,757, which is a continuation-in-part of Ser. No. 883,509, May 15, 1992, Pat. No. 5,256,758, which is a continuation-in-part of Ser. No. 712,380, Jun. 10, 1991, abandoned.

[51] Int. Cl.$^5$ ............................................. C08G 63/00
[52] U.S. Cl. ................................. 528/176; 528/100; 528/190; 528/192; 528/194; 524/601; 524/604
[58] Field of Search ............... 528/176, 100, 190, 192, 528/194; 524/601, 604

[56] References Cited

U.S. PATENT DOCUMENTS

| | | | |
|---|---|---|---|
| 2,993,873 | 7/1961 | Heinrich et al. | 260/22 |
| 3,778,410 | 12/1973 | Jackson et al. | 528/173 |
| 3,836,491 | 7/1974 | Taft et al. | 260/22 |
| 4,189,421 | 2/1980 | Shay et al. | 260/38 |
| 4,267,239 | 5/1981 | Thankachan et al. | 428/425.1 |
| 4,298,658 | 11/1981 | Thankachan et al. | 428/425.1 |
| 4,331,782 | 5/1982 | Linden | 525/173 |
| 4,331,783 | 5/1982 | Stoy | 525/294 |
| 4,340,718 | 7/1982 | Zannucci et al. | 528/128 |
| 4,343,839 | 8/1982 | Blegen | 427/340 |
| 4,355,133 | 10/1982 | East et al. | 524/604 |
| 4,405,764 | 9/1983 | Tobias et al. | 525/443 |
| 5,043,192 | 8/1991 | Jones et al. | 428/1 |
| 5,245,002 | 9/1993 | Kuo | 528/176 |
| 5,256,756 | 10/1993 | Kuo | 528/176 |
| 5,256,757 | 10/1993 | Kuo | 528/176 |
| 5,256,758 | 10/1993 | Kuo | 528/176 |
| 5,256,759 | 10/1993 | Kuo | 528/176 |

FOREIGN PATENT DOCUMENTS

| | | |
|---|---|---|
| 34919 | 9/1981 | European Pat. Off. . |
| 286444 | 10/1986 | European Pat. Off. . |
| 287233 | 10/1988 | European Pat. Off. . |
| 419088 | 3/1991 | European Pat. Off. . |
| 2266725 | 10/1975 | France . |
| 7540629 | of 0000 | Japan . |
| 51044130A | 4/1976 | Japan . |
| 51056839A | 5/1976 | Japan . |
| 52073929 | 6/1977 | Japan . |

OTHER PUBLICATIONS

Lenz and Jin, Polymer News, 1986, 11, 200.
P. W. Morgan, Macromolecules, 1977, 10, 1381.
Jackson et al., J. Polym. Sci., Polym. Chem. Ed., 1976, 12, 2043.
Jackson et al., Bs. Polym. J., 1980, 12, 154.
Chen and Jones, J. Coat. Technology, 1988, 60, 39.
Chen and Jones, J. Appl. Polym. Sci., 1988, 36, 141.
S. P. Pappas, J. Coat. Technol., 1989, 61, 51.
Patent Abstract of Japan, vol. 14, No. 232 (C-719) (4175) May 17, 1990 and JP, A, 25 8 559 (Hitachi Chem. Co. Ltd.) Feb. 27 1990 (abstract).
K. Maruyama, et al., Japan. Kokai 75 40,629, 1975; Chem. Abstr. 1975, 83, 133572y.
K. Maruyama, et al., Japan. Kokai 76 56,839, 1976; Chem. Abstr. 1976, 85, 110175y.
S. Nogami, et al., Japan. Kokai 76 44,130, 1976; Chem. Abstr. 1976, 85, 79835n.
S. Nogami, et al., Japan. Kokai 77 73,929, 1977; Chem. Abstr. 1978, 88, 8624u.

(List continued on next page.)

Primary Examiner—John Kight, III
Assistant Examiner—Duc Truong
Attorney, Agent, or Firm—Bernard J. Graves, Jr.; William P. Heath, Jr.

[57] ABSTRACT

Provided are enhanced phenolic-functional polyesters which are useful in enamel compositions. The enamel compositions provide coatings which exhibit superior hardness, impact resistance, acid resistance, and weatherability heretofore unachievable with other polyester-based coatings.

9 Claims, No Drawings

OTHER PUBLICATIONS

Dimian and Jones, "Liquid Crystalline Oligoester Diols as Thermoset Coatings Binders," Ch. 22 Cross-Linked Polymers, ACS Symposium Series 367.

Wang and Jones, "Synthesis of Cross-Linkable Heterogenous Oligoester Diols by Direct Esterification with p-Hydroxybenzoic Acid," Ch. 23, Cross-Linked Polymers, ACS Symposium Series 367.

Derwent Publication Ltd., London, GB; AN 90-103274 and JP, A, 2 053 881 (Towa Kasei Kogyo) Feb. 22, 1990 (Abstract).

Delvin and Ober, Polymer Bulletin, 20, 45-51 (1988).

Jin et al., British Polymer Journal, Dec., 1980, pp. 132-146.

Jones et al., Liquid Crystalline Polymers as Binders for Coatings, Fifteenth International Conference in Organic Coatings Science and Technology, Athens, Greece, Jul. 10-14 1989.

R. A. Dickie, et al., Eds., ACS; Washington, D.C., 1988, p. 324.

R. A. Dickie, et al., Eds., ACS; Washington, D.C., 1988, p. 335.

Olding and Hayward, Ed., "Resins for Surface Coatings," vol. III, SITA Technology, London, 1987, p. 171.

5,312,891

THERMOSETTING COATING COMPOSITIONS

CROSS-REFERENCE TO RELATED APPLICATIONS

This is a divisional application of copending application Ser. No. 07/954,993 filed on Oct. 1, 1992, U.S. Pat. No. 5,256,757 which is a continuation-in-part of application Ser. No. 07/883,509 U.S. Pat. No. 5,256,758 filed on May 15, 1992, which is a continuation-in-part of application Ser. No. 07/712,380 filed on Jun. 10, 1992 abandoned.

FIELD OF THE INVENTION

This invention belongs to the field of polymer chemistry. More particularly, this invention relates to improved phenolic-functional polyester coating compositions.

BACKGROUND OF THE INVENTION

There is a need in the coatings industry for high strength, high modulus, chemically-resistant coatings. For high modulus, the coatings must exhibit exceptional hardness, while for high strength, they must have good resistance to impact. As to chemical resistance, it is particularly desirable for automotive coatings to have excellent acid-etch resistance. This invention is directed toward the above objective. Crosslinkable polyester coatings resins are synthesized and formulated into industrial baking enamels from which surface coatings can be obtained, the cured films exhibiting a unique combination of hardness (pencil hardness >4H) and impact resistance (160 lb-in) as well as exceptionally high acid-etch resistance.

It has been demonstrated that thermotropic liquid crystal polymers (LCPs) possess many advantages over conventional thermoplastics. The self-reinforcement of the ordered polymeric molecules in the liquid crystalline (LC) state generally yield thermoplastics with exceptionally high strength and high modulus. In addition, LCPs have also been shown to have excellent solvent resistance, chemical resistance (e.g., acid, base, detergent), and weatherability. As described above, these properties are highly desirable in surface coatings. Recently, coating scientists have attempted to apply the LCP technology to the coatings art.

U.S. Pat. No. 5,043,192 (Jones) discloses the application of liquid crystalline polyesters to the coatings industry, while displaying high hardness and high impact resistance. In one of the examples, linear oligoester diols were prepared and modified with p-hydroxybenzoic acid (PHBA) to yield LC oligoesters. The PHB\diol mole ratio varied from 2.1/1 to 13/1. It was suggested that the excess of PHBA formed repeating p-oxybenzoyl LC segments in the oligoester chain ends. The resulting resins, however, were highly colored (i.e., brownish). The use of large quantities of the expensive raw material, PHBA, also made the resins commercially impractical.

European Patent Application No. 419088 discloses non liquid crystalline esterphenol-capped liquid polymer and polyol compositions in combination with an amino crosslinking agent which provided films having superior properties. The resins were prepared by following a procedure similar to that of Jones at a lower reaction temperature (i.e., <200° C.) A PHBA\aliphatic hydroxyl equivalent ratio of 1/1 was used mostly, although it was suggested the ratio could be ranged from about 0.05 to about 1.25. This reference teaches that the coatings showed improved hardness and impact resistance. However, by repeating their examples we found the coatings did not exhibit high acid resistance.

Curable resin compositions modified with hydroxybenzoic acid had also been reported by others. U.S. Pat. No. 2,993,873 disclosed that drying times and coating properties of oil-modified alkyd resins could be improved by replacing part of unsaturated fatty acids with hydroxybenzoic acid in the resin formulations. The coatings were cured by air dry or baking without the presence of a crosslinking agent. U.S. Pat. Nos. 4,267,239 and 4,298,658 describe the modification of alkyd resins with PHBA. The resulting resins could be rapidly cured at ambient temperatures with isocyanates in the presence of a tertiary amine vapor. U.S. Pat. Nos. 4,343,839 and 3,836,491 disclose a coating composition which is rapidly curable at room temperature in the presence of a tertiary amine catalyst vapor. The coating compositions comprised phenolic terminated polyesters and multi-isocyanate curing agents. U.S. Pat. No. 4,331,782 discloses the improved synthesis of a phenol-functional polyester polymer which utilizes a preformed adduct of a hydroxybenzoic acid and an epoxy compound. Japanese Patents No. 75 40,629, 76 56,839, 76 44,130, and 77 73,929 disclose powder coating compositions containing phenolic hydroxy end groups. These resins had high softening points and were applied to the surface as powders.

In an effort to raise the softening point of the melamine type crosslinking agent for powder coatings, U.S. Pat. No. 4,189,421 taught the synthesis of solid addition products having a softening point above 100° F. by the reaction of a monohydroxy, single-ring aromatic compound and a hexakis(alkoxymethyl)amino-triazine ring (e.g., hexamethoxymethylmelamine, HMMM). They found the phenol compound not only could react with HMMM to form ether linkages (O-alkylation), but it could also form methylene bridges at the phenol ortho- or para-position (C-alkylation). The extent of both reactions was essentially equal. Further ring closure of the resulting product could also have occurred.

In the present invention, a smaller amount of PHBA was incorporated into the resins (i.e., about 15–16 mole %) to provide phenolic functionalities. Unlike the procedures described in both Jones' and Yezrielev's examples, no organic solvent was used for the synthesis of the resin. This feature allows the resins to be used in waterborne coating compositions. Further, this process is suitable for economical industrial production. A branching agent, trimethylolpropane(TMP), was also incorporated into the resins which provided higher crosslink density. Further, I have discovered that the presence of TMP, a trifunctional compound, is required in order to yield higher molecular weight resins containing PHBA. Because the phenolic groups are not reactive under the conditions employed for resin synthesis, PHBA should be viewed as a monofunctional monomer which could terminate the polymer chain growth. I found that a triol such as TMP helps to propagate the growth of the polymer chain and affords surprisingly higher molecular weight resins; the coatings made possible by this discovery have strikingly better properties. This effect was found to be especially significant when PHBA was reacted with an excess of TMP only in the first stage of the resin synthesis as described below in the Examples. In these examples, the carboxyl group of the PHBA was capped by TMP to form a diol adduct in the first stage. The diol adduct was then polymerized with other diols and diacids in the second stage without causing the problem of decarboxylation of PHBA. The resulting resin had a number average molecular weight of greater than 2300 which was much higher than other resins containing a similar ratio of PHBA. Finally, attempts at end-capping the resins with PHBA in the final stage of the reaction were unsuccessful in providing resins with higher molecular weight— these attempts resulted in significant PHBA sublimation as well as degradation of the polymer chain due ostensibly to ester interchange reactions.

As described in the Experimental Section below, the mole ratios of the resin compositions were adjusted as necessary to afford coatings having the highest pencil hardness while still retaining the best impact resistance. The coatings also exhibited exceptionally high acid resistance in addition to other desirable properties.

SUMMARY OF THE INVENTION

The present invention provides oil-free polyester resin compositions containing phenolic functional groups which are prepared by an improved direct polycondensation process which is suitable for economical, large-sale production. The phenolic-functional resins thus produced are useful as coatings binders and thus may be dissolved in conventional solvents and formulated into thermosetting coating compositions which exhibit an extraordinary combination of pencil hardness and impact resistance as well as acid resistance. As noted below, substantially all of the hydroxy acid residues exist at the ends of the curable polyester chain, i.e., >90%. As used herein, the term "acid resistance" is intended to mean coatings which show very little degradative effect after exposure to 50% $H_2SO_4$ for 24 hours and whose free-standing films do not decompose in concentrated $H_2SO_4$ over a period of at least 30 minutes. Accordingly, these coatings compositions are especially useful for applications where extreme environmental impact may be expected, e.g., automobile body exteriors.

DETAILED DESCRIPTION OF THE INVENTION

The present invention provides an enamel composition which when applied to a substrate and cured provides a coating having a pencil hardness of greater than 4H, an impact resistance of greater than 140 lb.-in., and being substantially resistant to acidic corrosion, said composition comprising (I) about 25 to about 65 weight percent of a curable polyester having a number average molecular weight of about 1500 to about 3500 and a weight average molecular weight of about 10,000 to about 70,000, comprising
  (a) about 20 to 36 mole percent of diol residues, based on the total moles of (a), (b), (c), (d), and (e);
  (b) about 10 to about 21 mole percent of triol residues, based on the total moles of (a), (b), (c), (d), and (e);
  (c) about 5 to about 18 mole percent, based on the total moles of (a), (b), (c), (d), and (e), of residues of an aliphatic diacid.
  (d) about 25 to about 35 mole percent of aromatic dicarboxylic acid residues based on the total moles of (a), (b), (c), (d), and (e);
  (e) about 12 to about 20 mole percent, based on the total moles of (a), (b), (c), (d), and (e), of hydroxy acid residues selected from residues of

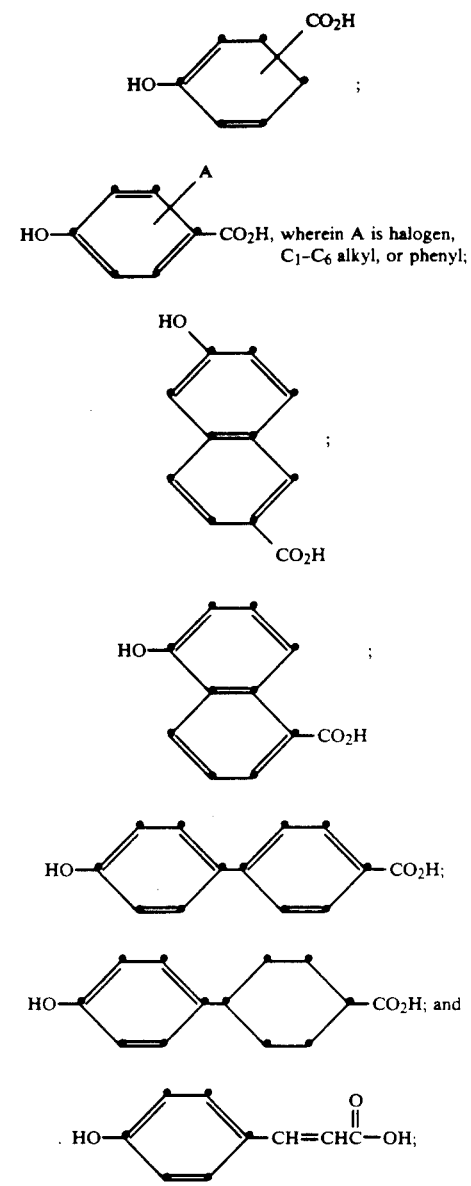

wherein substantially all of said hydroxy acid residues are at the ends of said curable polyester;

(II) about 5 to about 20 weight percent of an amino crosslinking agent; based on the total weight of (I), (II), and (III);

(III) about 30 to about 70 weight percent of an organic solvent, based on the total weight of (I), (II), and (III), the total being 100 percent.

As a further embodiment of the present invention, there is provided a water-borne enamel composition which comprises (I) about 25 to about 65 weight percent of a curable polyester having a number average molecular weight of about 1500 to about 3500 and a weight average molecular weight of about 10,000 to about 70,000, comprising
(a) about 20 to 36 mole percent of diol residues, based on the total moles of (a), (b), (c), (d), and (e);
(b) about 10 to about 21 mole percent of triol residues, based on the total moles of (a), (b), (c), (d), and (e);
(c) about 5 to about 18 mole percent, based on the total moles of (a), (b), (c), (d), and (e), of residues of an aliphatic diacid.
(d) about 25 to about 35 mole percent of aromatic dicarboxylic acid residues based on the total moles of (a), (b), (c), (d), and (e);
(e) about 12 to about 20 mole percent, based on the total moles of (a), (b), (c), (d), and (e), of hydroxy acid residues selected from residues of

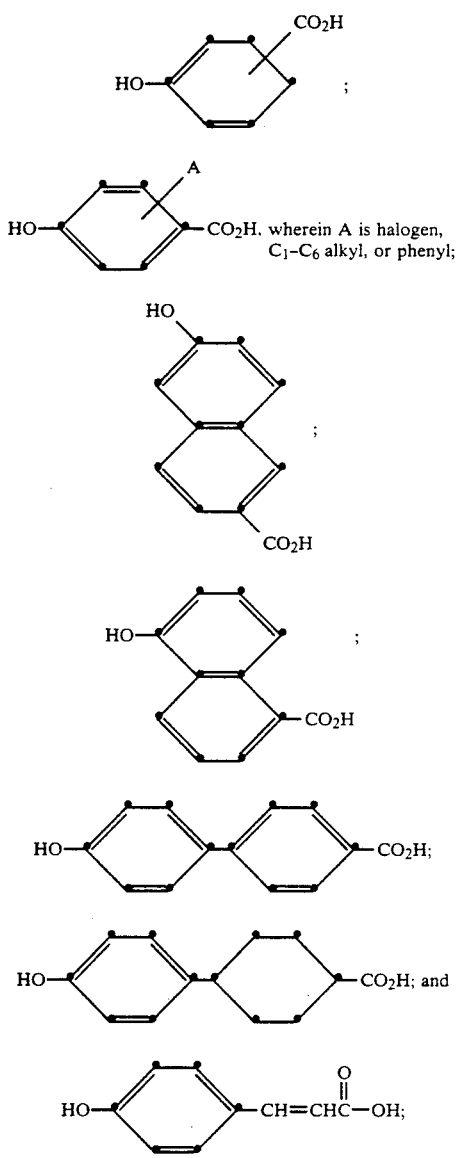

wherein substantially all of said hydroxy acid residues are at the ends of said curable polyester; wherein said curable polyester, if having an acid number of less than 40, is modified by treatment with a polybasic acid to yield a modified curable polyester having an acid number of about 40 to 70, followed by treatment of the curable polyester or modified polyester with about 1 to about 4 weight percent of an amine;

(II) about 5 to about 20 weight percent of an amino crosslinking agent;

(III) about 0 to about 10 weight percent of a water miscible organic solvent; and (IV) about 30 to about 70 weight percent of water.

In a further embodiment of the present invention, there is provided the above curable polyesters which are useful in the preparation of thermosetting coating compositions. Especially preferred curable polyesters having as component (a), residues of neopentyl glycol; as component (b), residues of trimethylolpropane; as component (c), residues of adipic acid; as component (d), residues of isophthalic acid; and as component (e), residues of p-hydroxybenzoic acid.

In the preparation of the curable polyesters of the present invention, it is preferred that the reactants be combined neat, and heated to a temperature of about 175° C. to about 230° C. Typical reaction times range from 5 hrs to about 20 hrs. The reaction generally requires the use of a steam heated partial-condenser to remove the condensate, water and/or alcohol, and at the same time condense back the volatile reactants.

The reaction is preferably carried out under the constant flow of nitrogen gas.

As a further aspect of the present invention, there is provided a process for preparing a curable polyester having a number average molecular weight of about 1500 to about 3500 and a weight average molecular weight of about 10,000 to about 70,000, comprising (a) about 20 to 36 mole percent of diol residues, based on the total moles of (a), (b), (c), (d), and (e);

(b) about 10 to about 21 mole percent of triol residues, based on the total moles of (a), (b), (c), (d), and (e);

(c) about 5 to about 18 mole percent, based on the total moles of (a), (b), (c), (d), and (e), of residues of an aliphatic diacid.

(d) about 25 to about 35 mole percent of aromatic dicarboxylic acid residues based on the total moles of (a), (b), (c), (d), and (e);

(e) about 12 to about 20 mole percent, based on the total moles of (a), (b), (c), (d), and (e), of hydroxy acid residues selected from residues of

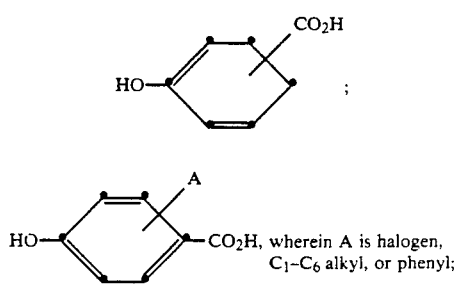

-continued

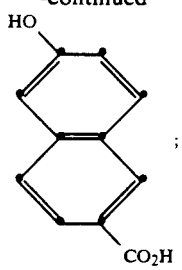

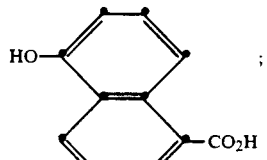

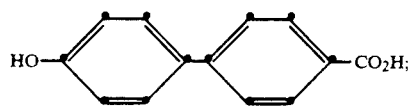

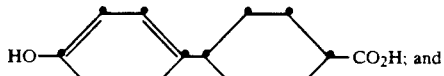

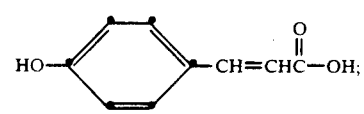

wherein substantially all of said hydroxy acid residues are at the ends of said curable polyester;

which comprises combining component (b) triol with component (e) in the presence of a condensation catalyst, followed by heating to a temperature sufficient to induce condensation, followed by addition of components (a), (d) and optionally (c), followed by continued heating until said condensation is substantially complete.

Preferred triols include trimethylolpropane, trimethylolethane, glycerol, and the like. Trimethylolpropane is the most highly preferred triol.

Preferably the aliphatic and aromatic dicarboxylic acid residues of the curable polyesters are selected from residues of oxalic; malonic, dimethylmalonic; succinic; glutaric; adipic; trimethyladipic; pimelic, 2,2-dimethylglutaric; azelaic; sebacic; fumaric; maleic; itaconic; phthalic; terephthalic; isophthalic; 2,5-norbornanedicarboxylic; 1,4-naphthalic; diphenic; 4,4'-oxydibenzoic, diglycolic; thiodipropionic; 4,4'-oxydibenzoic, diglycolic; thiodipropionic; 4,4'-sulfonyldibenzoic; 4,4'-biphenyldicarboxylic, and 2,6-naphthalenedicarboxylic acids.

The curable polyesters provided herein preferably have an acid number of not greater than 80 and a hydroxyl number of at least 10.

It should be appreciated that lower alkyl, i.e., $C_1$–$C_6$ alkyl, esters can be utilized in the above direct polycondensation, and in such an instance, the by-product of the condensation will be a lower ($C_1$–$C_6$) alcohol.

Component (e) above can be chosen from a wide variety of hydroxy acids. Examples of preferred monomers and include:

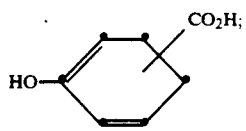

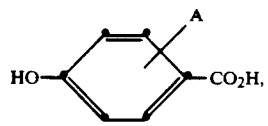

wherein A is halogen, $C_1$–$C_6$ alkyl, or phenyl;

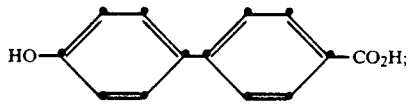

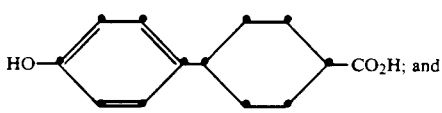

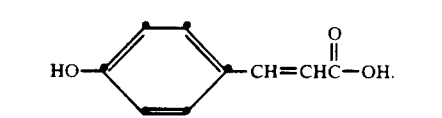

An especially preferred hydroxy acid is p-hydroxy benzoic acid.

The curable polyesters provided by the process above are useful as binders in thermosetting coating compositions.

It will be appreciated, of course, that in the above description and as described below, the various mole and weight percentages in the enamel compositions and curable polyesters will always total 100 percent.

Suitable solvents for the curable enamel composition include xylenes, cyclohexanone, ketones, (for example, methyl amyl ketone), 2-butoxyethanol, ethyl-3-ethoxypropionate, toluene, n-butanol, and other volatile inert solvents typically used in industrial baking (i.e., thermosetting) enamels.

The "amino cross linking agent" is preferably a melamine-formaldehyde type cross-linking agent, i.e., a cross-linking agent having a plurality of —N(CH$_2$OR$^3$)$_2$ functional groups, wherein R$^3$ is $C_1$–$C_4$ alkyl, preferably methyl.

In general, the cross-linking agent may be selected from compounds of the following formulae, wherein R$^3$ is independently $C_1$–$C_4$ alkyl:

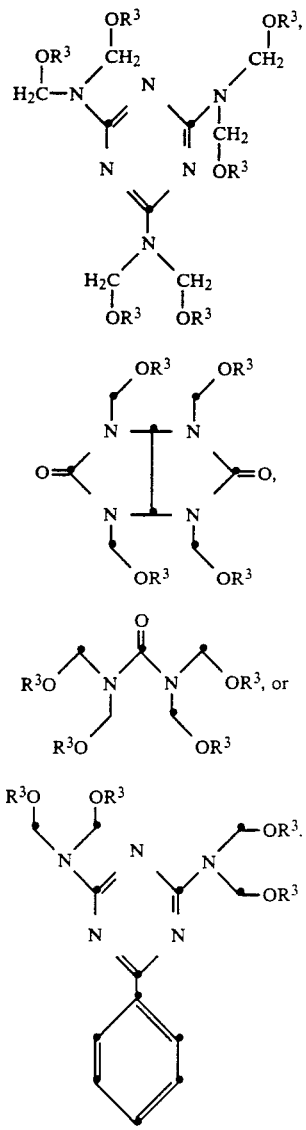

In this regard, preferred cross-linking agents include hexamethoxymethylmelamine, tetramethoxymethylbenzoguanamine, tetramethoxymethylurea, mixed butoxy/methoxy substituted melamines, and the like. The most preferred cross-linking agent is hexamethoxymethylmelamine.

As a further aspect of the present invention, there is provided a curable enamel composition further comprising one or more cross-linking catalysts. Examples of such catalysts include p-toluenesulfonic acid, and the NACURE ™ 155, 5076, 1051, catalysts sold by King Industries.

As a further aspect of the present invention there is provided a cross-linkable enamel composition as described above, further comprising one or more leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewicides; corrosion inhibitors; thickening agents; or coalescing agents.

Specific examples of such additives can be found in *Raw Materials Index*, published by the National Paint & Coatings Association, 1500 Rhode Island Avenue, N.W., Washington, D.C. 20005.

Examples of flatting agents include synthetic silica, available from the Davison Chemical Division of W.R. Grace & Company under the trademark SYLOID ®; polypropylene, available from Hercules Inc., under the trademark HERCOFLAT ®; synthetic silicate, available from J.M. Huber Corporation under the trademark ZEOLEX ®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetrasodium N-(1,2-dicarboxy-ethyl)-N-oxtadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all available from BYK Chemie U.S.A. under the trademark ANTI TERRA ®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the trademark BRU-BREAK of Buckman Laboratories Inc., under the BYK ® trademark of BYK Chemie, U.S.A., under the FOAMASTER ® and NOPCO ® trademarks of Henkel Corp./Coating Chemicals, under the DREW-PLUS ® trademark of the Drew Industrial Division of Ashland Chemical Company, under the TROYSOL ® and TROYKYD ® trademarks of Troy Chemical Corporation, and under the SAG ® trademark of Union Carbide Corporation.

Examples of fungicides, mildewicides, and biocides include 4,4-dimethyloxazolidine, 3,4,4-trimethyloxazolidine, midified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazole, hindered amine, and hindered benzoate, available from American Cyanamide Company under the tradename Cyasorb UV, and available from Ciba Geigy under the tradename Tinuvin, and diethyl-3-acetyl-4-hydroxy-benzyl-phosphonate, 4-dodecyloxy-2-hydroxy benzophenone, and resorcinol monobenzoate.

Such paint or coating additives as described above form a relatively minor proportion of the enamel composition, preferably about 0.05 weight % to about 5.00 weight %.

As a further aspect of the present invention, there is provided a curable enamel composition optionally containing one or more of the above-described additives, further comprising one or more pigments.

Pigments suitable for use in the enamel compositions envisioned by the present invention are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include but are not limited to the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1, and CI Pigment Red 57:1.

Upon formulation above, the curable enamel composition is then applied to the desired substrate or article, e.g., steel, aluminum, or galvanized sheeting (either primed or unprimed), heated (i.e., cured) to a temperature of about 140° C. to about 175° C., for a time period of 5-60 minutes and subsequently allowed to cool. Thus, as a further aspect of the present invention, there is provided a shaped or formed article which has been coated with the thermosetting coating compositions of the present invention and cured.

Further examples of typical application and curing methods can be found in U.S. Pat. Nos. 4,737,551 and 4,698,391, incorporated herein by reference.

As a further aspect of the present invention, there is provided a coating which results from the application and curing of the curable enamel composition as set forth above.

Experimental Section

In Examples 1 and 2 below, trimethylolpropane(TMP) with a mole ratio of 30% based on the total moles of diol and triol and an equivalent ratio of TMP/p-hydroxy benzoic acid(PHBA)=2.55 was used. The resulting resin was yellowish in color; however, it was found that when a color stabilizer (WESTON 618, Borg-Warner Chemicals Inc., 0.2 g) was added to the reaction mixture, the resulting resin was almost colorless.

EXAMPLE 1

Preparation of Resin 1

To a three-neck round bottom flask equipped with a mechanical stirrer, a steam partial condenser, a Dean-Stark trap, and a water condenser were charged the following reactants: TMP 30.28 g (0.23 mole), PHBA 36.83 g (0.27 mole), and the catalyst, FASCAT 4100 (0.2 g). The mixture was heated to 150° C. and stirred under $N_2$ atmosphere. The temperature was then gradually increased to 220° C. over a period of 0.5 hour and the distillate was collected in the Dean-Stark trap. When the collection of the distillate stopped (one additional hour), indicating the first stage reaction was almost complete, NPG 55.50 g (0.53 mole) and TPA 89.65 g (0.54 mole) were then added. After stirring for four more hours, AD 20.44 g (0.14 mole) was added. The reaction was complete after stirring for one more hour. The resulting viscous resin was collected in a metal container and cooled to room temperature.

EXAMPLE 2

Preparation of Resin 2

To a three-neck round bottom flask equipped with a mechanical stirrer, a steam partial condenser, a Dean-Stark trap, and a water condenser were charged the following reactants: TMP 121.1 g (0.90 mole), PHBA 146.5 g (1.06 mole), the catalyst, FASCAT 4100 0.5 g, and the color stabilizer, WESTON 618, 1 g. The mixture was heated to 150° C. and stirred under $N_2$ atmosphere. The temperature was then gradually increased to 220° C. in a period of one hour and the distillate was collected in the Dean-Stark trap. When the collection of the distillate stopped (1.5 more hours), indicating the first stage reaction was almost complete, neopentyl glycol (NPG) 222.0 g (2.13 mole) and isophthalic acid 358.6 g (2.16 mole) were then added. After stirring for 8 more hours, adipic acid (AD) 81.8 g (0.56 mole) was added. The reaction was complete after stirring for four more hours; the resulting viscous resin was collected in a metal container and cooled to room temperature.

A phenolic-functional (PF) resin prepared previously as described in the example of the previous patent application, U.S. Ser. No. 07/883,509, was used as the control for the resins of the present invention. The control resin contains the same equivalent ratio of PHBA, whereas it has a lower percentage of TMP (14 mole %). The synthesis of the control is shown in Example 3.

EXAMPLE 3

Preparation of Control 1

To a three-neck round bottom flask equipped with a mechanical stirrer, a steam partial-condenser, a Dean-Stark trap and a water condenser were charged the following reactants: NPG 72.66 g (0.70 mole), TMP 15.14 g (0.11 mole), TPA 89.65 g (0.54 mole), PHBA 36.83 g (0.27 mole), and the catalyst, FASCAT 4100 0.2 g. The mixture was heated to 150° C. and stirred under $N_2$ atmosphere. The temperature was then gradually increased to 220° C. in a period of two hours and the distillate was collected in the Dean-Stark trap. When the collection of the distillate stopped (4.5 more hours), indicating the first stage reaction was almost complete, AD 20.44 g (0.14 mole) was added. After stirring for 3.5 more hours, the resulting viscous resin was collected in a metal container and cooled to room temperature.

Molecular weights of the above resins were determined by gel permeation chromatography. The results are listed in Table I below.

TABLE I

| resin | Molecular Weight (MW) | |
|---|---|---|
| | number average MW | weight average MW |
| 1 | 3,200 | 66,000 |
| 2 | 2,300 | 18,000 |
| control 1 | 2,500 | 11,000 |

The resins were dissolved in a solvent mixture and formulated into industrial baking enamels as described in Example 4 below. It was found that resins 1 and 2 were quite soluble in a solvent mixture of 15% xylene, 70% MAK (methyl amyl ketone), and 15% EEP (ethyl 3-ethoxypropionate) by weight.

EXAMPLE 4

Preparation of Enamels

The resin (20 g) was dissolved in a suitable solvent mixture (20-40 g) above. To this solution were added the crosslinker, hexamethoxymethyl melamine (HMMM, CYMEL 303, 5 g), the acid catalyst (40% p-toluene sulfonic acid in isopropanol, 0.2-0.4 g), and a flourocarbon flow control additive (20% FLOURAD FC-430 in isopropanol, 0.3 g). The mixture was stirred in a mixer to give a clear enamel (resin:HMM ratio was 80:20). The enamel was applied to cold-rolled steel test panels and baked at 175° C. for 20 minutes. The film thickness was about 1.0-1.5 mil. These panels were used in the following tests.

EXAMPLE 5

Acid-Etch Resistance Test

The acid-etch resistance of the coatings was carried out by adding a few drops (e.g., 6 drops) of 10% sulfuric acid onto the film surfaces of the above coated panels and baked in an oven at various temperatures (i.e., 40°, 50°, 60°, 70°, and 80° C.) for 30 minutes. The residual acid solutions were then washed off, and their effects on the coating listed in Table II below.

TABLE II

| | Acid-Etch Resistance | | | | |
|---|---|---|---|---|---|
| resin | 40° | 50° | 60° | 70° | 80° C. |
| 1 | 1 | 1 | 1 | 1-2 | 6 |
| 2 | 1 | 1 | 1 | 1-2 | 6 |
| control 1 | 1 | 1 | 4 | | |

1 = no effect
2 = partial loss of gloss
3 = loss of gloss
4 = partial loss of gloss
5 = loss of adhesion
6 = decomposition of film As illustrated above, the acid-etch resistance of the coatings based on the resins of the present invention have been improved significantly over the previous phenolic-functional resin.

It was also found that RESIMENE 755 (half butylated and half methylated melamine, available from Monsanto) generally gives better acid-etch resistance than CYMEL 303 (fully methylated melamine, available from American Cyanamid)—sometimes by 10°.

Accellerated weathering tests of various coatings were carried out according to ASTM method G-53 (UV Accellerated Weathering) and method D-822 with Cores glass filter (Carbon-Arc Accellerated Weathering). The results are shown below in Table III.

TABLE III

| | Acellerated Weathering Tests | |
|---|---|---|
| | 60°/20° | |
| | % gloss retention after 500 hours | |
| resin | Carbon Arc | QUV |
| 1 | 81/64 | 99/99 |
| 2 | 90/83 | 100/100 |
| control 1 | 43/14 | 97/90 |

It was also found that RESIMENE 755 generally gave similar results as CYMEL 303, only that the carbon arc test of resin 1, was a little higher-89/80.

Example 6

Preparation of Water-Borne Enamel Composition

Resin 2 (40 g) was heated to 180° C. and stirred in a round-bottom flask equipped with a water condenser. Trimellitic anhydride (1 g) was then added to the above resin and stirred for 30 minutes. After the mixture was cooled to 80° C. a co-solvent, ethylene glycol monobutyl ether (10 g) was added, followed by DMAE (1.25 g). The resulting viscous solution was then dispersed in distilled water (60 g) at 50° C. followed by the addition of CYMEL 303 (16 g), and FLUORAD FC-430 (20% in isopropanol, 0.6 g) to yield a water-borne enamel.

I claim:

1. A curable polyester having a number average molecular weight of about 1500 to about 3500 and a weight average molecular weight of about 10,000 to about 70,000, comprising:
   (a) about 20 to 36 mole percent of diol residues, based on the total moles of (a), (b), (c), (d), and (e);
   (b) about 10 to about 21 mole percent of triol residues, based on the total moles of (a), (b), (c), (d), and (e);
   (c) about 5 to about 18 mole percent, based on the total moles of (a), (b), (c), (d), and (e), of residues of an aliphatic diacid,
   (d) about 25 to about 35 mole percent of aromatic dicarboxylic acid residues based on the total moles of (a), (b), (c), (d), and (e);
   (e) about 12 to about 20 mole percent, based on the total moles of (a), (b), (c), (d), and (e), of hydroxy acid residues selected from residues of

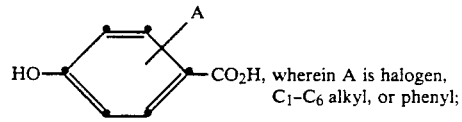
wherein A is halogen, $C_1$-$C_6$ alkyl, or phenyl;

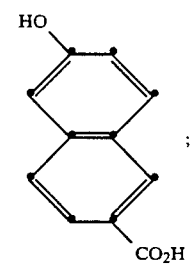

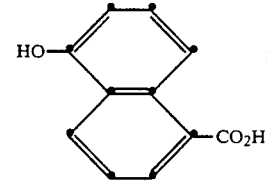

-continued

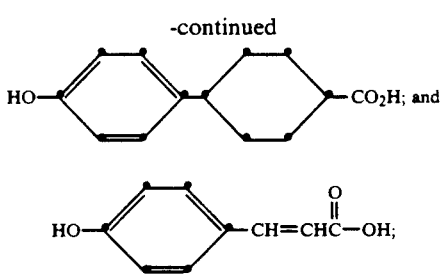

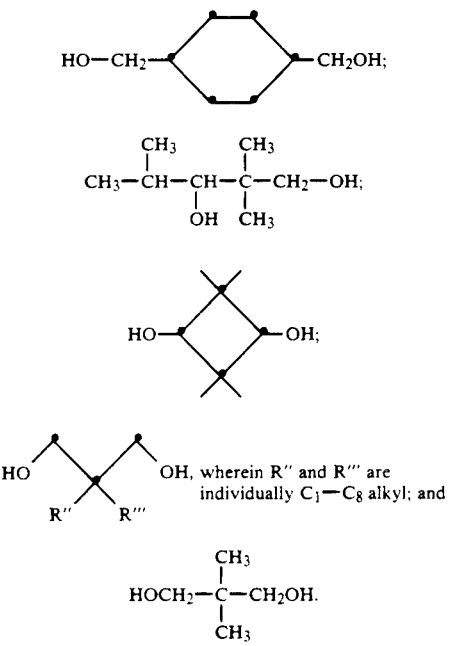

wherein substantially all of said hydroxy acid residues are at the ends of said curable polyester.

2. The curable polyester of claim 1, wherein component
(a) diol residues are selected from residues of

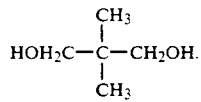

3. The curable polyester of claim 1, wherein component (b) triol residues are selected from residues of trimethylolpropane, trimethylolethane, and glycerol.

4. The curable polyester of claim 1, wherein the component (a) diol residue is comprised of a residue of the formula

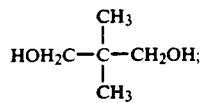

5. The curable polyester of claim 1, wherein the component (b) triol residue consists essentially of trimethylolpropane residues.

6. The curable polyester of claim 1, wherein the component (e) hydroxy acid residue is a residue of the formula

7. The curable polyester of claim 1, wherein the component (a) diol residues are comprised of a residue of the formula

component (b) triol residues are comprised of trimethylolpropane residues;
component (c) aliphatic diacid residues are comprised of adipic acid residues;
component (d) aromatic diacid residues are comprised of isophthalic acid residues; and
component (e) hydroxy acid residues are comprised of residues of

HO—⬡—CO₂H.

8. A process for preparing a curable polyester having a number average molecular weight of about 1500 to about 3500 and a weight average molecular weight of about 10,000 to about 70,000, comprising
 (a) about 20 to 36 mole percent of diol residues, based on the total moles of (a), (b), (c), (d), and (e);
 (b) about 10 to about 21 mole percent of triol residues, based on the total moles of (a), (b), (c), (d), and (e);
 (c) about 5 to about 18 mole percent, based on the total moles of (a), (b), (c), (d), and (e), of residues of an aliphatic diacid,
 (d) about 25 to about 35 mole percent of aromatic dicarboxylic acid residues based on the total moles of (a), (b), (c), (d), and (e);
 (e) about 12 to about 20 mole percent, based on the total moles of (a), (b), (c), (d), and (e), of hydroxy acid residues selected from residues of

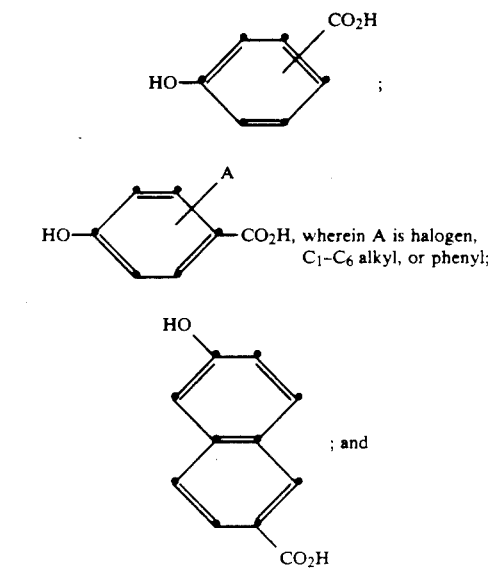

-continued

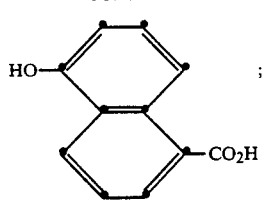

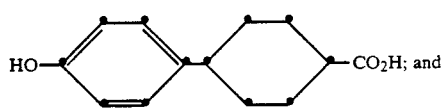

-continued

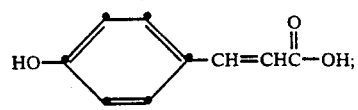

wherein substantially all of said hydroxy acid residues are at the ends of said curable polyester;
which comprises combining component (b) triol with component (e) in the presence of a condensation catalyst, followed by heating to a temperature sufficient to induce condensation, followed by addition of components (a), (d) and optionally (c), followed by continued heating until said condensation is substantially complete.

9. The process of claim 8, wherein component (a) is neopentyl glycol, component (b) is trimethylolpropane, component (c) is adipic acid, component (d) is isophthalic acid, and component (e) is p-hydroxybenzoic acid or a lower alkyl ester thereof.

* * * * *